Figure 1:
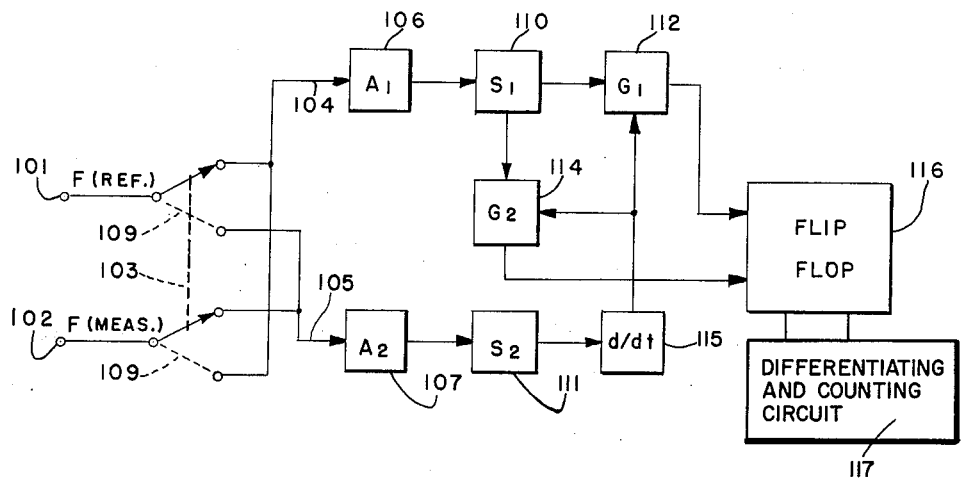

Oct. 9, 1962  B. L. SHER  3,058,063

FREQUENCY COMPARISON MEANS

Filed May 29, 1959  3 Sheets-Sheet 1

INVENTOR.
BERNARD L. SHER
BY
ATTORNEY

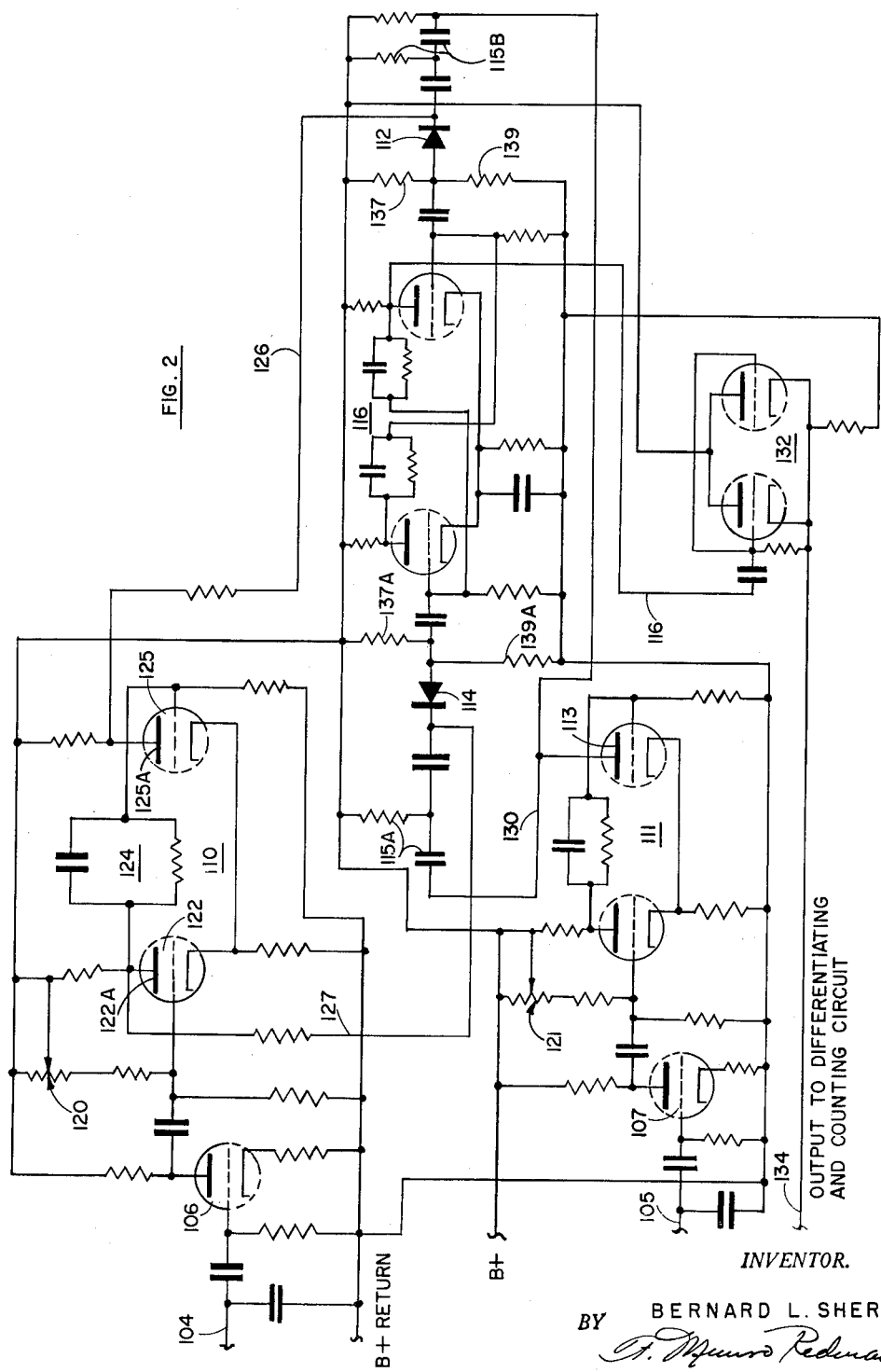

Oct. 9, 1962   B. L. SHER   3,058,063
FREQUENCY COMPARISON MEANS
Filed May 29, 1959   3 Sheets-Sheet 3

INVENTOR.
BERNARD L. SHER
BY
ATTORNEY

# United States Patent Office 3,058,063
Patented Oct. 9, 1962

3,058,063
FREQUENCY COMPARISON MEANS
Bernard L. Sher, Los Angeles, Calif., assignor to North American Aviation, Inc.
Filed May 29, 1959, Ser. No. 816,981
12 Claims. (Cl. 324—79)

This invention relates to frequency comparison equipment and particularly to a novel means for obtaining a count indicating whether the deviation between a measured frequency and a reference frequency is within acceptable tolerance limits.

The invention operates by first squaring the waveform of the input frequency to be measured and the waveform of the reference frequency input. These squared wave inputs are then used as signals to gate and trigger an output flip-flop. The output pulse repetition frequency is the difference between the frequency to be measured and the reference frequency. The output pulses are registered by applying them to a conventional counting circuit. If the count is below a certain value, the circuit is within the proper operational range.

The invention provides a circuit capable of delivering an output voltage, the frequency of which is the difference of two input frequencies over a specified range, which in a typical situation is 10 cycles per second to 10 kilocycles per second. The output is capable of consistently triggering a flip-flop so that it may be counted by a binary counter.

In the prior art the technique usually used to solve the frequency comparison problem was to mix the two frequencies and obtain a carrier frequency amplitude modulated at the difference frequency. With this method the carrier frequency was filtered out, leaving the modulating wave at the difference frequency. However, certain disadvantages make the use of this method prohibitive. One of these is that as the frequency to be measured varies from the reference frequency, the difference frequency increases and as a result becomes more attenuated by the filter until it can no longer be of use.

Another difficulty is that the system is not flexible because the filters have to be changed whenever the reference frequency is changed. This is necessary whenever the reference frequency and the frequency to be measured vary by more than 10 or 15 percent of each other, because of the disadvantages listed above.

It is thus an object of the invention to provide a simple means for comparing frequencies in equipment over a broad range with a standard frequency.

A further object is to provide a more readily usable circuit for determining when equipment is functioning within defined limits of frequency variation from a standard.

Figure 3:
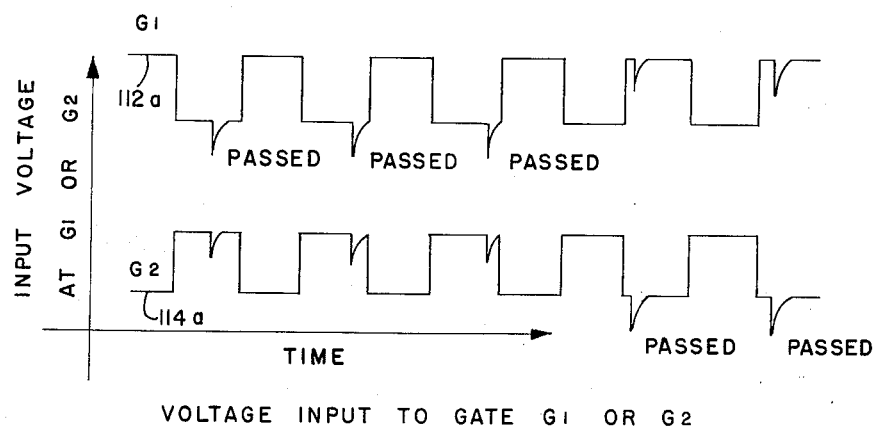
Figure 4:
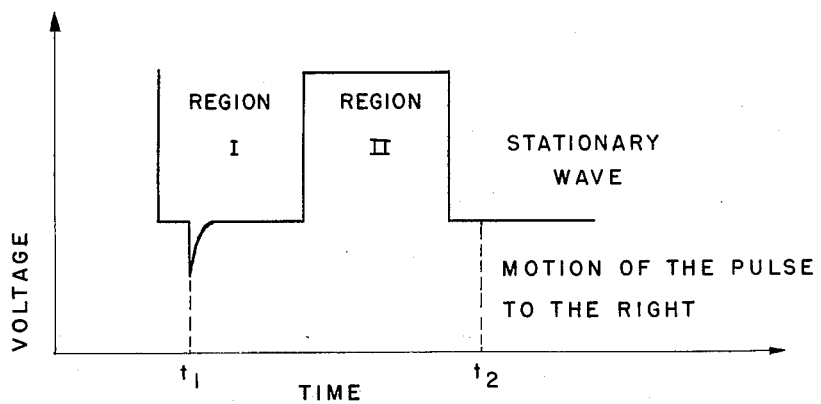
Figure 5:
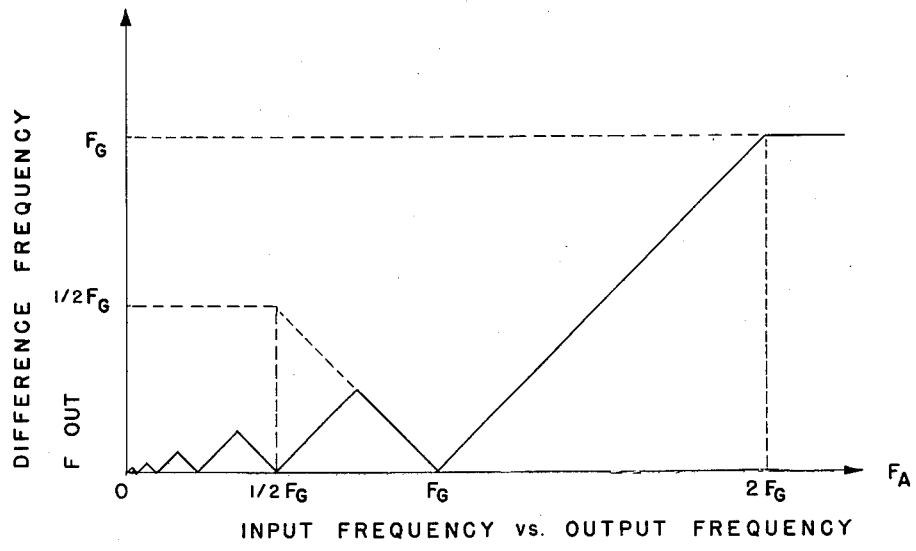

Other objects of the invention will become apparent from the following description, taken in connection with the accompanying drawings, in which:

FIG. 1 is a block diagram of the invention;
FIG. 2 is a diagram showing a specific embodiment of the principles of the circuit of FIG. 1;
FIG. 3 is a graph illustrating the outputs of the gates $G_1$ and $G_2$ of FIG. 1 plotted against a common time base;
FIG. 4 is a diagram showing in expanded form the shape of the voltage waves at different portions of the cycle plotted against the time base; and
FIG. 5 is a graph showing the relation between the input frequency and the output frequency as related to the difference frequency.

Referring now to the block diagram of FIG. 1, the reference frequency is applied through a reference frequency input terminal 101, while the unknown frequency to be compared with the standard is applied through a measured frequency input terminal 102. The input terminals 101 and 102 are connected through a double-pole double-throw switch 103 in a first position through lines 104 and 105 to conventional amplifiers 106 and 107, respectively. If the double-pole double-throw switch 103 is moved to its second position, as indicated by the dotted line showing at 109, the input potentials are reversed and the reference frequency is applied to amplifier 107, while the frequency to be measured is applied to amplifier 106.

In the particular embodiment of FIG. 2, the showing of the reversing switch 103 is omitted, and the potentials applied through input lines 104 and 105 are sine waves of approximately 5.5 volts, peak-to-peak. Each of the amplifiers 106 and 107 has a gain of between 10 and 15. The outputs of these amplifiers are sinusoids of approximately 60 volts peak-to-peak, and are connected to conventional Schmitt triggers 110 and 111, respectively. These trigger circuits may be of the type illustrated in FIGS. 8–11 on p. 277 of the text, "Recurrent Electrical Transients," by Von Tersch & Swago, published by Prentice-Hall in 1953. These triggers receive the sinusoidal currents and transform them to square waves of about 50 volts amplitude peak-to-peak. In the case of Schmitt trigger 110, which receives the output of amplifier 106, the square wave outputs are taken off both the anodes 122A and 125A of both tubes 122 and 125, respectively, and directly used to control the position of the gates 112 and 114. In the case of trigger 111, the output is taken from only one anode 113. A square wave is taken off this anode and is treated in the differentiating circuits 115 and 115B to produce sharp pulses.

The pulses so obtained are led to gates 112 and 114 which, when open, transmit the pulses to the grids of opposite tubes of a flip-flop 116, the anodes of which supply the desired output. A suitable conventional flip-flop may be of the Eccles-Jordan type shown in FIGS. 8–7 on p. 273 of the text referred to above.

The voltage relations as a function of time at the inputs of gates 112 and 114 are shown graphically in FIG. 3. The input voltage at gate 112 is indicated at 112a in the upper part of the figure, while that at the input to gate 114 is indicated at 114a in the lower part. When the low voltage portion of the square wave is applied to gate 112, that gate is in a position to pass a pulse, while at the same instant, gate 114 has the high voltage portion of the square wave applied to it and is consequently closed. Similarly, when the low voltage portion of the square wave is applied to gate 114, that gate is in position to pass a pulse, while gate 112 has the high voltage portion of the square wave applied to it, and is accordingly closed. As the pulse drifts through successive regions of high and low voltage, since access to the grids is obtained only through the gates 112 and 114, a series of pulses is applied to first one grid and then the other grid of the flip-flop 116. Only the first of the series of pulses to a grid of the flip-flop is capable of triggering the circuit. The output square wave of the flip-flop is applied to a conventional differentiating and counting circuit 117, not shown in detail. Here the square wave is differentiated and its source impedance changed by a conventional cathode follower, from which only the negative pulses are used. Thus, the difference frequency is obtained and registered on the conventional indicating portion of the differentiating and counting circuit 117.

Referring now to FIG. 2 of the drawings, there is shown a schematic connection diagram for the elements shown in block form in FIG. 1. Like reference numerals are used in FIG. 2 to refer to similar specific portions of the circuit shown in FIG. 1 in block form. One input signal, which will be assumed to be the reference frequency, is applied from the switch 103, not here shown, through line 104 to the control electrode of an amplifier 106, the output from which is fed to the Schmitt trigger circuit shown generally as 110. Symmetry control for the Schmitt trigger circuit is provided by adjustable resistor means indicated generally as 120.

Similarly, the unknown frequency whose deviation from the standard is to be determined is applied through line 105 to the control electrode of an amplifier 107, which delivers the amplified output to a Schmitt trigger circuit 111. Symmetry control for trigger circuit 111 is provided by an adjustable resistance network indicated generally as 121.

The Schmitt trigger circuit 110 utilizes a triode 122, which accepts as an input the amplified signal from tube 106, and has coupled to the output thereof, through a resistance and capacitance network 124, an input connection to the control element of a second trigger circuit tube 125. The output of tube 125 is coupled back through the symmetry control resistance network 120 to the grid of tube 122. Tubes 122 and 125 work together in accordance with the well-known principles of a Schmitt trigger, delivering an output to the gating circuits 112 and 114 through lines 126 and 127, respectively.

Similarly, the unkown frequency to be measured is applied to the control element of amplifier tube 107, from which it is passed to the Schmitt trigger 111 through the symmetry control resistance network indicated generally at 121. The output of trigger 111 is then conveyed through a differentiator 115A to gate 114, and through a differentiator 115B to gate 112. The output of gate 112 is delivered to one side of the flip-flop 116 while the output of gate 114 is delivered to the other side of flip-flop 116. A cathode follower circuit indicated generally at 132 is disposed in the output of flip-flop 116 in order to provide improved impedance matching. The output signal is delivered through flip-flop output lead 134. This output is utilized in a second differentiating circuit having conventional counting means associated therewith, not shown in detail here. Such meas, for example, may include any suitable registering means for indicating, recording, or counting information as to the number of output pulses received.

High precision resistors 137 and 139, which may be of the ceramic type suited to hold their values within one percent, may be inserted to fix the bias on diode 112. Similar resistors 137A and 139A may be used to fix the bias on diode 114.

To understand the process involved more clearly, consider further what is happening at the input to gates 112 and 114, as seen graphically in FIG. 3. The pulses shown are of a frequency that is slightly smaller than the square wave frequency, and thus appear to move to the right with respect to the square waves. The time that it takes a pulse to coincide with its original position in time with respect to the square wave may be seen to be the period of the difference frequency.

After one cycle of both voltages the waves will have moved an incremental distance in time relative to one another equal to $$\left(\frac{1}{F_L} - \frac{1}{F_H}\right)$$

where $F_L$ is the lower frequency, and $F_H$ the higher frequency. To reappear in its original position in time relative to the square wave, the pulse must move through a sum of increments equal to the period of the higher frequency, $1/F_H$, or $$\frac{\frac{1}{F_H}}{\frac{1}{F_L} - \frac{1}{F_H}}$$

increments.

Since each increment takes $1/F_L$ amount of time to materialize, the time $t$ necessary for the pulse to return to its original position relative to the square wave is $$\frac{\frac{1}{F_L F_H}}{\frac{1}{F_L} - \frac{1}{F_H}}$$

This is equal to $$\frac{1}{F_H - F_L}$$

in turn equal to $t$, the period of the difference frequency.

It may be seen from the foregoing and by reference to FIG. 4 that the time $t$ it takes the pulse to advance from $t_1$ to $t_2$ is the period of the difference frequency. By recording the number of times the pulse appears in region I after traveling through region II in a given time, the difference frequency is simply determined. Essentially this then is what is done by the frequency comparison equipment. It will be seen that the outputs of the trigger circuits 110 and 111 are cyclic signals of the same frequency respectively as the frequency of the cyclic signals applied at 104 and 105. Each pulse provided from differentiator 115 represents a point on a cycle of the signal from the trigger circuit 111. Referring to FIG. 4, when a negative pulse from the differentiating circuit first coincides in time with a negative-going portion of the cyclic output of trigger 110 (at time $t_1$) the pulses fed through one of the two gates set the flip flop 116 into one of its two possible conditions. This pulse which first sets the flip flop represents the time of coincidence of a point on the cycle of the signal from the circuit 111 with a point on the cycle from circuit 110. This pulse occurs when the output of the differentiator first appears within region I of FIG. 4. When the differentiator output first appears within region II of FIG. 4, the second of the two gates provides an output to the other side of the flip flop 116 whereby the latter is reset to the second of its two conditions. Now, when the corresponding points on subsequent cycles of the two cyclic signals provided at the output of triggers 110 and 111 again coincide in time (at time $t_2$ of FIG. 4) the first gate again provides an output to set the flip flop. The interval between flip flop setting pulses is indicative of the magnitude of the frequency difference of the two cyclic signals since it is actually a measure of the period of such difference frequency.

The frequency comparison circuit herein described has an input frequency related to the output frequency as shown in FIG. 5. The frequencies fed to amplifier 107 of FIG. 2 are shown along the abcissa. The difference frequency fed to amplifier 106 is represented by the symbol $F_G$, since it controls the gating. It is desirable that between the reference frequency and the measured frequency as introduced at terminals 101 and 102, the smaller would be chosen as $F_G$, which may be readily accomplished by changing the position of the switch 103. The determination of which is the larger or smaller is not important if two successive measurements are made and the leads supplying the reference and measured frequencies are interchanged in the second measurement by the use of this switch. If this is done, then that portion of the curve to the right of $F_G$ in FIG. 5 becomes the region of operation in one of the measurements. The advantages of operating to the right of $F_G$ in FIG. 5 are immediately obvious from an inspection of the curve.

The embodiment illustrated is an extremely accurate device which is capable of delivering an output within a count in the least significant digit of the difference frequency.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electrical circuit comprising a first electrical means providing a square wave output of a first frequency, said first means having first and second opposite phase outputs; a second means providing a square wave output of a second frequency; a first and second gate connected to receive respective outputs of said first electrical means, said gates being controlled in accordance with the output of said second means, and means responsive to both said gates for indicating the magnitude of the difference between said first and second frequencies.

2. The combination recited in claim 1 wherein said gates are controlled in accordance with the output of said second means by means of a differentiating circuit connected to receive the output of said second means and connected to control said gates.

3. A device for comparing a frequency to be measured and a reference frequency comprising a first and second channel respectively handling different ones of said frequencies, each having a trigger circuit, at least one of which has two output connections; a first gating circuit connected between one output connection of said trigger circuit having two output connections and one input side of a flip-flop; a second gating circuit connected between the other output connection of said trigger circuit having two output connections, and the opposite input side of said flip-flop; first means for differentiating the output of said second trigger circuit to obtain a pulse; means for applying said pulse to both said gating circuits; and means for applying output pulses passed by said gating circuits to second differentiating and counting means.

4. In a device for measuring the frequency difference between a standard and an unknown; means for applying said standard and said unknown frequencies simultaneously to two separate channels; an amplifier disposed in each of said channels; a trigger circuit connected in each of said channels to the output of said amplifier; a pair of gates connected to the output of said trigger circuit in one of said channels; a differentiating circuit connected to the output of said trigger circuit in the other of said channels; a flip-flop; means for utilizing the output of said differentiating means to control the application of signals from both said gating circuits to said flip-flop; and means associated with the output of said flip-flop for counting pulses.

5. Means for comparing the frequencies of input voltages applied to two channels comprising means for utilizing said input voltages to set up square waves having the same fundamental frequencies as those of said voltages in said two channels; means for differentiating the one of said square waves in one of said channels whereby pulses are set up in that channel; means for transmitting said pulses to a pair of gates, said gates being alternately opened and closed by square waves from the other of said channels; said pulses after passage through said gates in their opened position being applied to a flip-flop circuit whereby output pulses from said flip-flop may be produced at a frequency equal to the difference between the fundamental frequencies applied to each of said channels; and means for comparing the accumulated output pulse count with a preset reference count to determine whether said frequency is within allowable limits.

6. A device for comparing an unkonwn frequency with a reference frequency comprising a first channel having a Schmitt trigger circuit; a second channel having a Schmitt trigger circuit; switching means adapted to apply, in a first position, said unknown frequency to said first channel and said reference frequency to said second channel, and to apply, in a second position, said reference frequency to said first channel and said unknown frequency to said second channel; first and second gating circuits arranged to receive pulses from said Schmitt trigger circuit in said first channel, and to deliver an output to a flip-flop circuit; a differentiating circuit arranged to receive pulses from said second channel Schmitt trigger circuit, and to deliver the differentiated pulses resulting to said first and second gating circuits, said gating circuits being adapted to pass pulses of negative potential to said flip-flops; said flip-flops being adapted to be triggered by the first only of each series of pulses thereto; differentiating and pulse counting means connected to the output of said flip-flops; and means for changing said switching means from one to the other of said first and second positions.

7. In a device for comparing an unknown frequency with a reference frequency, the combination of a first channel having a Schmitt trigger circuit; a second channel having a Schmitt trigger circuit; input switching means adapted to apply, in a first position, said unknown frequency to said first channel and said reference frequency to said second channel; and to apply, in a second position, said unknown frequency to said second channel and said reference frequency to said first channel; first and second gating circuits arranged to receive pulses from said Schmitt trigger circuit in said first channel; a flip-flop in each of said channels arranged to receive the output from said gating circuits; means for differentiating the output of said second channel trigger circuit and for applying the output of said differentiating means to said gating circuits; said gating circuits being adapted to pass pulses of negative potential to said flip-flops; means for differentiating and registering the output of said flip-flops; and means for reversing said input switching means.

8. Apparatus for determining the difference in frequency between first and second signals of unknown frequency difference comprising first and second gates, means responsive to said first signal for providing a first input to both said gates at the frequency of said first signal, means responsive to said second signal for providing a second input to both said gates at the frequency of said second signal, one of said first and second inputs being applied to said first and second gates with respectively opposite polarity, and output means responsive to both said gates for indicating the magnitude of the difference in frequency between said first and second inputs.

9. Apparatus for determining the difference in frequency between first and second signals of unknown frequency difference comprising first and second gating devices, means for alternately and repetitively opening and closing said devices in mutually opposite phase at the frequency of said first signal, means responsive to said second signal for pulsing both said gates in phase at the frequency of said second signal, and output means responsive to both said gates for providing an indication of the magnitude of the difference in frequency between said signals.

10. Apparatus for determining the difference in frequency between first and second cyclic signals comprising: first pulse generating means for generating two pulse trains in mutually opposite phase at the frequency of said first signal; means for generating a pulse at a predetermined fixed phase position in each cycle of said second signal; first and second gating means connected to be alternately and repetitively opened and closed in mutually opposite phase at the frequency of said first signal; said pulses being connected in phase at the frequency of said second signal to the inputs of said gates to be channeled through the particular one of said gates which is open; and switching means connected to the outputs of said gates to be responsive to close said switch when an output occurs at a first one of said gates and to open said switch when an output occurs at a second one of said gates, the frequency of opening and closing of said switch being a measure of the difference frequency between said first and second signals.

11. A device for comparing an unknown frequency with a reference frequency comprising: a first channel having a trigger circuit; a second channel having a trigger circuit; switching means adapted to apply, in a first position, said unknown frequency to said first channel and said reference frequency to said second channel, and to apply in a second position, said reference frequency to said first channel and said unknown frequency to said second channel; a second switching means; first and second gating circuits arranged to receive pulses from said trigger circuit in said first channel, and to deliver an output to said second switching means to cause said switching means to assume a first switching state; a differentiating circuit arranged to receive pulses from said second channel trigger circuit, and to deliver the differentiated pulses which result to said first and second gating circuits, said gating circuits being adapted to pass pulses to control the state of said second switching means; said second switching means being adapted to be switched from the one said state to the other said state by the first only of each series of pulses passing through a particular said gating means; means for counting the changes of state of said second switching means; and means for changing said first switching means from one to the other of said first and second positions.

12. A device for comparing an unknown frequency with a reference frequency comprising: a first channel having a trigger circuit; a second channel having a trigger circuit; said unknown frequency being applied to said first channel and said reference frequency to said second channel; first and second gating circuits arranged to receive pulses from said trigger circuit in said first channel; a differentiating circuit arranged to receive pulses from said second channel trigger circuit and to deliver the differentiated pulse which result to said first and second gating circuits, said gating means being connected to be opened in phase opposition by the signal from the said first channel at the frequency of the signal in said first channel; switching means having a first and second switching state connected to the outputs of said gating means to assume a first of said switching states when a pulse is received from a first of said gating circuits and to change gating states, said switching means being adapted to assume a first of said switching states when it receives a pulse from a first of said gating means and to assume a second of said gating states when a pulse from the second of said gating means is channeled to said switching means; and means for counting the changes of state of said second switching means, the rate of change of change of state of said switching means being a measure of the difference in frequency between said unknown and said reference frequency.

References Cited in the file of this patent

UNITED STATES PATENTS

| | | |
|---|---|---|
| 2,403,527 | Hershberger | July 9, 1946 |
| 2,473,853 | Boykin | June 21, 1949 |
| 2,530,035 | Watt | Nov. 14, 1950 |
| 2,665,411 | Frady | Jan. 5, 1954 |
| 2,702,852 | Briggs | Feb. 22, 1955 |
| 2,795,695 | Raynsford | June 11, 1957 |
| 2,844,721 | Minkow | July 22, 1958 |
| 2,858,425 | Gordon | Oct. 28, 1958 |
| 2,903,691 | Rossi et al. | Sept. 8, 1959 |
| 2,911,641 | Kohler | Nov. 3, 1959 |
| 2,913,664 | Wang | Nov. 17, 1959 |
| 2,923,820 | Liquori | Feb. 2, 1960 |
| 2,940,042 | Fisher | June 7, 1960 |
| 2,987,674 | Shain | June 6, 1961 |